United States Patent [19]
Ueno et al.

[11] 3,943,629
[45] Mar. 16, 1976

[54] TRAINING MACHINE FOR INTRA-ORAL INSTRUMENTATION

[75] Inventors: Hiroshi Ueno; James W. Grenfell; Fred M. Sorenson, all of Portland, Oreg.; Kazuo Hozumi, Joyo, Japan

[73] Assignee: Kabushiki Kaisha Morita Seisakusho, Kyoto, Japan

[22] Filed: Aug. 1, 1974

[21] Appl. No.: 493,692

[30] Foreign Application Priority Data
Aug. 6, 1973    Japan................... 48-88231

[52] U.S. Cl............. 32/71; 35/17; 35/22 R; 273/1 E
[51] Int. Cl.² ..................... G09B 23/28
[58] Field of Search ............. 32/22, 71; 35/17, 22 R, 35/22 A, 37; 273/1 E, 88

[56] References Cited
UNITED STATES PATENTS

| | | | |
|---|---|---|---|
| 2,095,511 | 10/1937 | Oberto............................ | 32/71 |
| 2,207,153 | 7/1940 | Judovich........................ | 35/17 |
| 2,265,598 | 12/1941 | Firestone et al. ................ | 273/1 E |
| 2,521,500 | 9/1950 | Braund........................... | 273/88 |
| 2,808,263 | 10/1957 | Goldfinger et al. ............. | 273/1 E |
| 2,943,855 | 7/1960 | Javna et al. ..................... | 273/1 E |
| 3,029,526 | 4/1962 | Olalainty ........................ | 273/1 E |
| 3,299,512 | 1/1967 | Brigante......................... | 32/71 |
| 3,562,927 | 2/1971 | Moskowitz ..................... | 35/37 UX |
| 3,673,708 | 7/1972 | Bevens........................... | 35/37 |
| 3,690,020 | 9/1972 | McBratnie ...................... | 35/37 |

FOREIGN PATENTS OR APPLICATIONS

1,119,462   12/1961   Germany .................... 32/71

*Primary Examiner*—Louis G. Mancene
*Attorney, Agent, or Firm*—Christensen, O'Connor, Garrison & Havelka

[57] ABSTRACT

A training machine for intra-oral instrumentation for dental treatment which comprises a plate carrying an electrically conductive path on the surface thereof; an imitation dental instrument with an imitation dental tool detachably attached thereto, so that a trainee traces said conductive path with said tool; and means for measuring the time during which said conductive path is being traced with said tool. A shield is attachable to the machine so that the trainee can look at the pattern of the conductive path either directly without the shield or only through a mirror with the shield attached to the machine.

20 Claims, 4 Drawing Figures

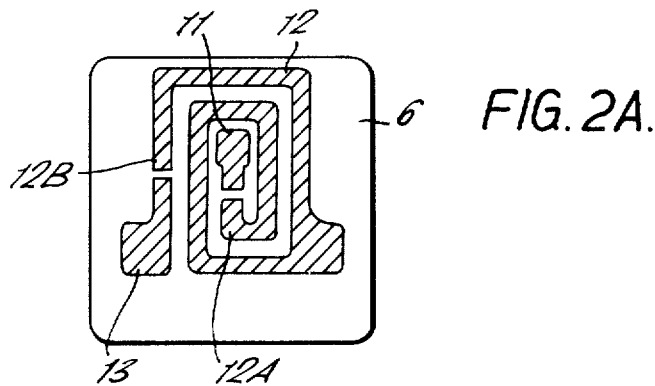
FIG. 2A.
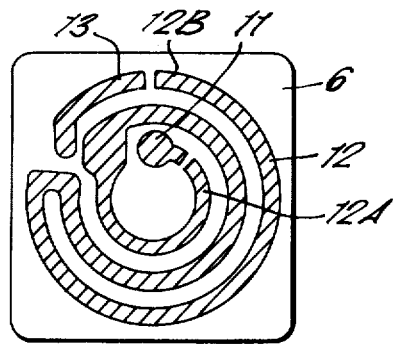
FIG. 2B.
FIG. 3.
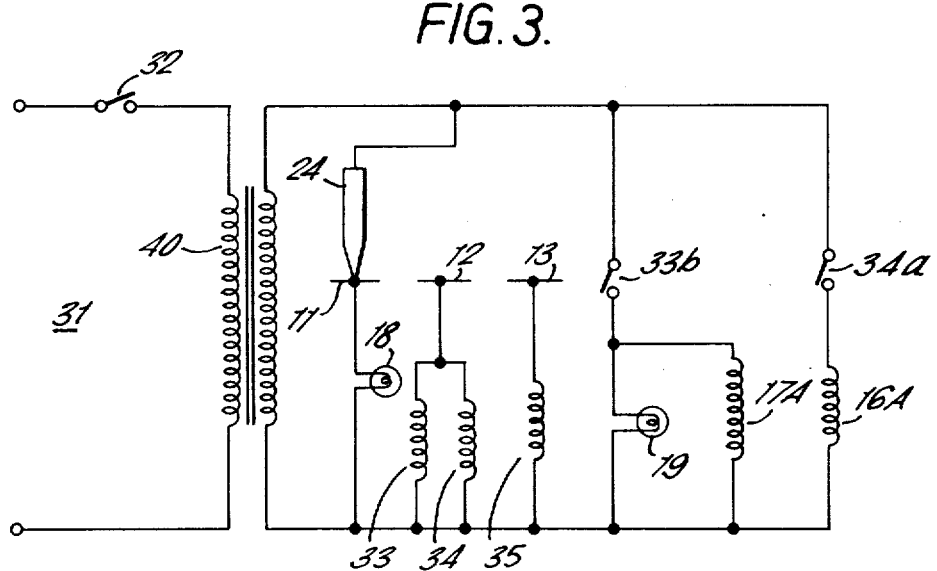

TRAINING MACHINE FOR INTRA-ORAL INSTRUMENTATION

This invention relates to a training machine for intra-oral instrumentation.

Cutting and drilling of a tooth and filling of medicine in tooth cavities are very important operations in dental treatment. Teeth are relatively small and exist in an oral cavity so that the above operations are very difficult to perform. Moreover, the position of a tooth in the oral cavity or the kind of treatment to be performed sometimes makes it impossible for a dentist to look directly at the tooth on which he is to perform a treatment. In such a case, a mirror is usually employed to look at the tooth. However, since the sensation one has when one looks at a tooth indirectly through a mirror is different from the sensation one has when one looks directly at the tooth, much skill is required for performing dental treatment through a mirror.

For training dental students in intra-oral instrumentation a dental mannekin with a model of teeth mounted in the oral cavity thereof is in general use. However, with such a mannekin alone it is impossible to decide whether the training has been properly performed, and the judgement of the result of the training can be made only by the trainee himself.

Accordingly, the primary object of the invention is to provide a training machine for intra-oral instrumentation for dental treatment, which enables objective judgment of the result of training in intra-oral instrumentation.

Another object of the invention is to provide such a training machine as aforesaid, which enables objective judgement of the result of the training no matter whether it has been conducted with the teeth being looked at directly or indirectly through a mirror.

Another object of the invention is to provide such a training machine as aforesaid, which enables judgement of the result of the training as a function of time.

Another object of the invention is to provide such a training machine as aforesaid, which enables judgement of the result of the training as a function of the number of failures during the course of training.

Still another object of the invention is to provide such a training machine as aforesaid, which enables judgement of the result of the training as a function of the product of the time required for the training and the number of failures scored during the course of the training.

A further object of the invention is to provide such a training machine as aforesaid, in which training is conducted by sliding the front end of an imitation dental instrument along a non-linear path.

In accordance with the invention, an electrically conductive path having the shape or pattern of a square, circle, spiral, or any other configuration is provided so that the trainee traces the path with the front end of an imitation dental instrument he holds in his hand like a pen. An electrical circuit which is closed so long as the imitation instrument is in contact with the conductive path is provided so that the time taken for the imitation instrument to travel from the starting to the terminating ends of the conductive path is measured and the number of deviations of the instrument from the path during the travel is counted.

From either or both of the time and the number it is possible to decide the result of the training. For example, the shorter the time, the faster the speed of tracing; and the smaller the number, the better the manner of tracing. If the number is great even when the time is relatively short, it means that the manner of tracing has not been very good, and if the time is long even when the number is relatively small, it means that the speed of tracing has been slow.

The invention will be explained further in detail with reference to the accompanying drawings, wherein:

FIG. 2a is a top plan view of the plate shown in FIG. 1 carrying a pattern of conductive path;

FIG. 2b is a view similar to FIG. 2a but showing the plate having a different pattern of conductive path; and FIG. 3 is a diagram of a control circuit of the machine of the invention.

Figure 1:
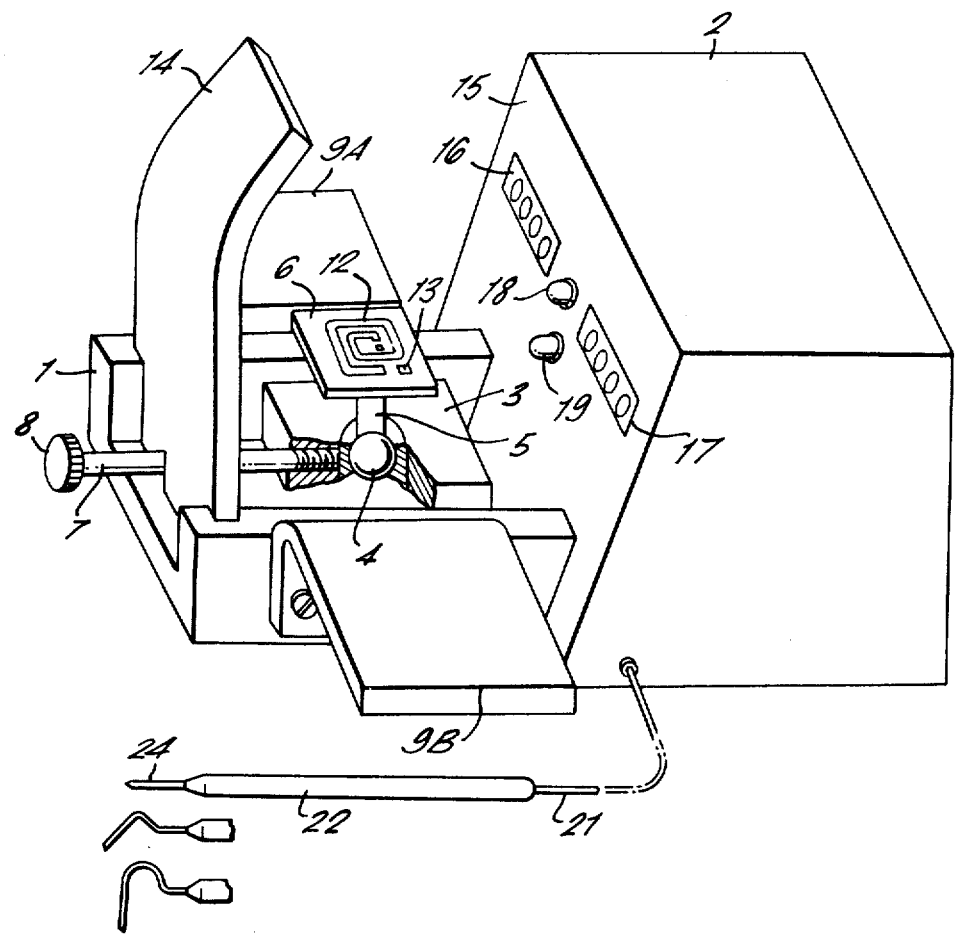
FIG. 1 is a perspective view, partly cut away, of a training machine constructed in accordance with the invention.

Referring to FIG. 1, there are shown a channel-shaped frame 1 and a console 2. The frame 1 has a base 3 fixed in the channel thereof and a universal joint 4 is provided in the base. A vertical rod 5 is connected to the universal joint and carries a plate 6 of insulating material on top thereof. A horizontal rod 7 projects in front of the frame 2 with a knob 8 fixed to the front end of the rod 7, so that upon turning of the knob 8 the rod 7 fixes the the joint 4 to the base 7 or releases the fixing of the joint in a well-known manner. Thus by inclining the rod 5 to a desired position and then fixing the joint it is possible to maintain the plate 6 at a corresponding inclined position.

A pair of finger rests 9A and 9B are secured to the frame 1 at the opposite sides of the base 3 so that the trainee can rest his finger tip, thereon while he manipulates the imitation instrument on the plate 6.

On the upper surface of the plate there is provided a pattern of conductive path comprising a start conductive portion 11, a training conductive portion 12 and a finish conductive portion 13. These conductive portions are made of, for example, copper foil and are formed on the surface of the plate in a well-known manner such as in manufacturing a printed circuit board. The start and finish portions 11 and 13 are of a relatively small area while the training portion 12 has a considerable length and extends non-linearly, for example, squarely spirally as shown in FIG. 2a or circularly spirally as shown in FIG. 2b.

A shield plate 14 is detachably attached to the frame 1 and with the shield 14 attached to the frame, the trainee in front of the frame 1 cannot directly look at the pattern on the plate 6 but only through a mirror.

On the front panel 15 of the console 2 there is provided a digital counter 16 which measures and indicates the tracing time and a digital counter 17 which counts and indicates the number of deviations of the instrument of the conductive path 12 during the course of training and a pair of indicating lamps 18 and 19.

A cable 21 is withdrawn out from the console so as to be connected to an imitation dental instrument 22 provided with an imitation tool 24 which is exchangeable with a different type of imitation tool.

Without the shield 14 attached to the frame, the trainee looks directly at the pattern on the plate 6 and brings the tool 24 of the instrument 22 he holds like a pen into contact with the start conductive portion 11 and traces with the tool the elongated conductive portion 12 from its start point 12A to its end point 12B and then puts the tool on the finish conductive portion 13.

The time taken for the tool 24 to be moved from the portions 11 to 13 is indicated by the counter 16; and the number of deviations of the tool 24 off the conductive path 12 during the course of tracing is indicated by the counter 17. Thus the time required for the travel from the conductive portion 11 to the conductive portion 13 and the number of deviations of the tool from the conductive portion 12, that is, the number of failures in tracing can be known at the counters 16 and 17. The shorter the time and the smaller the number, the better the operation of tracing that has been conducted. Needless to say, the product of the time and the number may be used as a value which indicates the result of the training.

The pilot lamp 18 is turned on when the tool 24 contacts the conductive portion 11 so as to indicate that the tool now is at the start point of the training; and the pilot lamp 19 is turned on whenever the tool deviates off the conductive path 12 during the course of tracing.

When training is to be conducted with a mirror, the shield is attached to the frame 1 as shown in FIG. 1, so that the trainee cannot directly look at the pattern on the plate 6. With a mirror in one hand and the tool in the other, the trainee looks at the pattern on the plate 6 through the mirror and traces it with the tool in the same manner as mentioned above.

FIG. 3 shows a circuit for controlling the operation of the counters and the lighting of the pilot lamps. These elements are enclosed in the console 2.

An alternating voltage is supplied through a pair of terminals 31. The voltage is impressed through a switch 32 across a transformer 40 which lowers the source voltage to a level safe to the human body. With the switch 32 closed, when the tool 24 is brought into contact with the conductive portion 11, the lamp 18 is lighted. When the tool 24 then contacts the conductive path 12, relay coils 33 and 34 are energized. Upon energization of the coil 33 the normally closed contact 33b of the relay is opened. Upon energization of the coil 34 the normally open contact 34a of the relay is closed so as to energize a coil 16A, which actuates the time measuring counter 16 to measure time from that time on.

The relay 34 is of a self-holding type so that once it is energized, the contact 34a is kept closed even when the tool 24 deviates from the conductive path 12 until a relay coil 35 is energized to release the locking of the relay 34 to open the contact 34a, as will be described later.

When the tool 24 deviates off the conductive path 12 during the course of tracing, the coil 33 is deenergized so that the contact 33b is closed to light the lamp 19 and at the same time energize a coil 17A which actuates the counter 17 to add "1" to the digital value registered therein till then.

When the tool 24 is returned to the conductive path 12, the relay coil 33 is again energized to open the contact 33b, so that the lamp 19 is turned off and the relay coil 17A is deenergized.

When the tool 24 reaches the end 12B of the conductive path 12 and then touches the finish conductive portion 13, the coil 35 is energized to release the locking of the relay 34.

Thus, in accordance with the invention there is provided a training machine which enables not only efficient training of dental students in intra-oral instrumentation required for cutting, drilling of teeth and other operations in dental treatment, but also digital indication of the result of the training, which improves the efficiency of the training.

What we claim is:

1. A training machine for intra-oral instrumentation for dental treatment, comprising a plate carrying an electrically conductive path on the surface thereof; an imitation dental instrument with an imitation dental tool detachably attached thereto, so that a trainee traces said conductive path with said tool; means for measuring the time during which said conductive path is being traced with said tool; and means for shielding said plate so that said plate is visible to said trainee only through a mirror.

2. The machine of claim 1, further including means for counting the number of deviations of said tool off said conductive path during the course of tracing.

3. The machine of claim 1, wherein said path includes an elongated portion extending non-linearly.

4. The machine of claim 1, wherein said measuring means comprises a circuit which is closed when said tool is in contact with said conductive path, and a counter which operates upon closure of said circuit to measure the time passed from the time of said closure and continues to operate until said tool finishes tracing of said conductive path.

5. The machine of claim 2, wherein said counting means comprises a circuit which is closed when said tool is in touch with said conductive path and opened whenever said tool deviates off said conductive path during the course of tracing, and a counter for counting the number of times said circuit is opened.

6. The machine of claim 3, wherein said conductive path includes a second portion separate from said elongated portion, so that said tool is brought into contact with said second portion before said tool is brought into contact with said elongated portion.

7. The machine of claim 6, further including a lamp which is turned on when said tool is brought into contact with said second conductive portion.

8. The machine of claim 5, further including a lamp which is turned on upon each said deviation of said tool.

9. The machine of claim 6, wherein said conductive path includes a third portion separate from said elongated portion, so that said tool is brought into contact with said third portion after said tool has finished tracing said elongated portion.

10. The machine of claim 9, wherein said measuring means stops its measuring upon contact of said tool with said third conductive portion.

11. A training machine for intra-oral instrumentation for dental treatment, comprising a plate carrying an electrically conductive path on the surface thereof, an imitation dental instrument with an imitation dental tool detachably attached thereto, said tool being interchangeable with a different imitation tool, so that a trainee traces said conductive path with said tool; and means for measuring the time during which said conductive path is being traced with said tool.

12. The machine of claim 11, further including means for counting the number of deviations of said tool off said conductive path during the course of tracing.

13. The machine of claim 11, wherein said path includes an elongated portion extending non-linearly.

14. The machine of claim 11, wherein said plate is directly visible to said trainee.

15. The machine of claim 11, wherein said measuring means comprises a circuit which is closed when said tool is in contact with said conductive path, and a counter which operates upon closure of said circuit to measure the time passed from the time of said closure and continues to operate until said tool finishes tracing of said conductive path.

16. The machine of claim 12, wherein said counting means comprises a circuit which is closed when said tool is in touch with said conductive path and opened where said tool deviates off said conductive path during the course of tracing, and a counter for counting the number of times said circuit is opened.

17. The machine of claim 16, further including a lamp which is turned on when said tool is brought into contact with said second conductive portion.

18. The machine of claim 16, further including a lamp which is turned on upon each said deviation of said tool.

19. The machine of claim 17, wherein said conductive path includes a third portion separate from said elongated portion, so that said tool is brought into contact with said third portion after said tool has finished tracing said elongated portion.

20. The machine of claim 19, wherein said measuring means stops its measuring upon contact of said tool with said third conductive portion.

* * * * *